United States Patent
Wong et al.

(10) Patent No.: US 10,678,601 B2
(45) Date of Patent: Jun. 9, 2020

(54) ORCHESTRATION SERVICE FOR MULTI-STEP RECIPE COMPOSITION WITH FLEXIBLE, TOPOLOGY-AWARE, AND MASSIVE PARALLEL EXECUTION

(71) Applicant: Oracle International Corporation, Redwood Shores, CA (US)

(72) Inventors: Lik Wong, Redwood Shores, CA (US); Girish Balachandran, Redwood Shores, CA (US); Shravan Kumar Shivanagari, Hyderabad (IN); Taylor Gautier, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 208 days.

(21) Appl. No.: 15/978,454

(22) Filed: May 14, 2018

(65) Prior Publication Data

US 2019/0065241 A1 Feb. 28, 2019

Related U.S. Application Data

(60) Provisional application No. 62/553,108, filed on Aug. 31, 2017.

(51) Int. Cl.
*G06F 11/00* (2006.01)
*G06F 9/50* (2006.01)
(Continued)

(52) U.S. Cl.
CPC .............. *G06F 9/5072* (2013.01); *G06F 8/60* (2013.01); *G06F 8/65* (2013.01); *G06F 9/4843* (2013.01);
(Continued)

(58) Field of Classification Search
CPC .... G06F 9/4843; G06F 9/5011; G06F 9/5072; G06F 9/5083; G06F 11/0721;
(Continued)

(56) References Cited

U.S. PATENT DOCUMENTS 6,597,777 B1 7/2003 Ho
7,672,814 B1 3/2010 Raanan et al.
(Continued)

FOREIGN PATENT DOCUMENTS

CN 105426411 A 3/2016

OTHER PUBLICATIONS

Charapko, Gorilla—Facebook's Cache for Time Series Data, http://charap.co/gorilla-facebooks-cache-for-monitoring-data/, Jan. 11, 2017.
(Continued)

*Primary Examiner* — Joshua P Lottich
(74) *Attorney, Agent, or Firm* — Invoke

(57) ABSTRACT

Techniques are described for orchestrating execution of multi-step recipes. In an embodiment, a method comprises receiving a request to execute a recipe specification that defines a sequence of steps to execute for a particular recipe; responsive to receiving the request to execute the recipe specification, instantiating a set of one or more recipe-level processes; wherein each recipe-level process in the set of one or more recipe-level processes manages execution of a respective instance of the particular recipe; triggering, by each recipe-level process for the respective instance of the particular recipe managed by the recipe-level process, execution of the sequence of steps; wherein triggering execution of at least one step in the sequence of steps by a recipe-level process comprises instantiating, by the recipe-level process, a plurality of step-level processes to execute the step on a plurality of target resources in parallel.

20 Claims, 10 Drawing Sheets

(51) Int. Cl.
*H04L 29/08* (2006.01)
*G06F 8/60* (2018.01)
*H04L 12/24* (2006.01)
*G06F 8/65* (2018.01)
*G06F 9/48* (2006.01)
*G06F 11/07* (2006.01)

(52) U.S. Cl.
CPC .......... *G06F 9/5011* (2013.01); *G06F 9/5027* (2013.01); *G06F 9/5038* (2013.01); *G06F 9/5083* (2013.01); *G06F 11/0721* (2013.01); *G06F 11/0751* (2013.01); *G06F 11/0793* (2013.01); *H04L 41/00* (2013.01); *H04L 41/5025* (2013.01); *H04L 41/5051* (2013.01); *H04L 67/1008* (2013.01); *H04L 67/1034* (2013.01); *H04L 41/5096* (2013.01)

(58) Field of Classification Search
CPC ............. G06F 11/0751; G06F 11/0793; H04L 41/5096; H04L 67/1034
See application file for complete search history.

(56) References Cited

U.S. PATENT DOCUMENTS

| | | | |
|---|---|---|---|
| 8,583,649 | B2 | 11/2013 | Ailon et al. |
| 8,635,328 | B2 | 1/2014 | Corley et al. |
| 8,676,964 | B2 | 3/2014 | Gopalan et al. |
| 8,776,066 | B2 | 7/2014 | Krishnamurthy et al. |
| 8,949,677 | B1 | 2/2015 | Brundage et al. |
| 9,053,171 | B2 | 6/2015 | Ailon et al. |
| 9,141,914 | B2 | 9/2015 | Viswanathan et al. |
| 9,195,563 | B2 | 11/2015 | Scarpelli |
| 9,471,778 | B1 | 10/2016 | Seo et al. |
| 9,495,220 | B2 | 11/2016 | Talyansky |
| 9,495,395 | B2 | 11/2016 | Chan et al. |
| 9,507,718 | B2 | 11/2016 | Rash et al. |
| 9,529,630 | B1 * | 12/2016 | Fakhouri ............... G06F 9/5011 |
| 9,740,402 | B2 | 8/2017 | Manoharan et al. |
| 9,811,394 | B1 * | 11/2017 | Kogias .................. G06F 9/541 |
| 2002/0183972 | A1 | 12/2002 | Enck et al. |
| 2002/0188650 | A1 | 12/2002 | Sun et al. |
| 2005/0119982 | A1 | 6/2005 | Ito et al. |
| 2007/0011281 | A1 * | 1/2007 | Jhoney .................. G06Q 10/10 709/220 |
| 2007/0150329 | A1 * | 6/2007 | Brook .............. G06Q 10/06375 705/7.13 |
| 2008/0288089 | A1 * | 11/2008 | Pettus ................. G05B 19/4184 700/9 |
| 2010/0082132 | A1 * | 4/2010 | Marruchella .... G05B 19/41835 700/86 |
| 2010/0082697 | A1 | 4/2010 | Gupta et al. |
| 2010/0324869 | A1 | 12/2010 | Cherkasova et al. |
| 2011/0022879 | A1 * | 1/2011 | Chavda ............... G06F 11/0793 714/1 |
| 2012/0066389 | A1 | 3/2012 | Hegde et al. |
| 2012/0110462 | A1 | 5/2012 | Eswaran et al. |
| 2012/0110583 | A1 * | 5/2012 | Balko .................. G06F 9/4843 718/102 |
| 2012/0240072 | A1 | 9/2012 | Altamura et al. |
| 2012/0323988 | A1 | 12/2012 | Barzel et al. |
| 2013/0329981 | A1 | 12/2013 | Hiroike |
| 2014/0101300 | A1 * | 4/2014 | Rosensweig .......... G06F 9/5072 709/223 |
| 2014/0215470 | A1 * | 7/2014 | niguez ................ G06F 9/4843 718/102 |
| 2014/0325649 | A1 | 10/2014 | Zhang |
| 2015/0032775 | A1 | 1/2015 | Yang et al. |
| 2015/0046920 | A1 | 2/2015 | Allen |
| 2015/0180734 | A1 * | 6/2015 | Maes .................... G06F 9/5072 709/226 |
| 2015/0242243 | A1 | 8/2015 | Balakrishnan et al. |
| 2015/0244597 | A1 * | 8/2015 | Maes ..................... G06Q 10/10 715/736 |
| 2015/0251074 | A1 | 9/2015 | Ahmed et al. |
| 2015/0296030 | A1 * | 10/2015 | Maes .................... G06F 9/5072 715/736 |
| 2015/0312274 | A1 * | 10/2015 | Bishop ................ H04L 41/5009 726/1 |
| 2016/0034328 | A1 | 2/2016 | Poola et al. |
| 2016/0042289 | A1 | 2/2016 | Poola et al. |
| 2016/0092516 | A1 | 3/2016 | Poola et al. |
| 2016/0139964 | A1 | 5/2016 | Chen et al. |
| 2016/0171037 | A1 | 6/2016 | Mathur et al. |
| 2016/0253381 | A1 | 9/2016 | Kim et al. |
| 2016/0292611 | A1 | 10/2016 | Boe et al. |
| 2016/0294773 | A1 | 10/2016 | Yu et al. |
| 2016/0299938 | A1 | 10/2016 | Malhotra et al. |
| 2016/0357674 | A1 | 12/2016 | Waldspurger et al. |
| 2017/0249564 | A1 | 8/2017 | Garvey et al. |
| 2017/0249648 | A1 | 8/2017 | Garvey et al. |
| 2017/0249649 | A1 | 8/2017 | Garvey et al. |
| 2017/0249763 | A1 | 8/2017 | Garvey et al. |
| 2017/0262223 | A1 | 9/2017 | Dalmatov et al. |
| 2017/0364851 | A1 | 12/2017 | Maheshwari et al. |
| 2018/0026907 | A1 | 1/2018 | Miller et al. |
| 2018/0052804 | A1 | 2/2018 | Mikami et al. |
| 2018/0321989 | A1 * | 11/2018 | Shetty ................. H04L 63/0853 |
| 2018/0330433 | A1 * | 11/2018 | Frenzel ................. G06Q 40/02 |
| 2019/0065275 | A1 * | 2/2019 | Wong ........................ G06F 8/65 |

OTHER PUBLICATIONS

Slipetskyy, Rostyslav, "Security Issues in OpenStack", Masters Thesis, Technical University of Denmark, Jun. 2011, p. 7 (entire document especially abstract).

Yokoyama, Tetsuya, "Windows Server 2008, Certification Test, Part 5: Reliability", Apr. 15, 2008, pp. 124-125 along with 4 pages of English Translation.

Faraz Rasheed, "A Framework for Periodic Outlier Pattern Detection in Time-Series Sequences," May 2014, IEEE.

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Greuen, "Forecasting Methods for Cloud Hosted Resources, a comparison," 2015, 11th International Conference on Network and Service Management (CNSM), pp. 29-35 (Year 2015).

Ahmed, Reservoir-based network traffic stream summarization for anomaly detection, Article in Pattern Analysis and Applications, Oct. 2017.

Wilks, Samuel S. "Determination of sample sizes for setting tolerance limits." The Annals of Mathematical Statistics 12.1 (1941): 91-96.

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream." IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

* cited by examiner

US 10,678,601 B2

ORCHESTRATION SERVICE FOR MULTI-STEP RECIPE COMPOSITION WITH FLEXIBLE, TOPOLOGY-AWARE, AND MASSIVE PARALLEL EXECUTION

BENEFIT CLAIMS; RELATED APPLICATIONS; INCORPORATION BY REFERENCE

This application claims the benefit of U.S. Provisional Patent Application 62/553,108, filed Aug. 31, 2017, which is hereby incorporated by reference.

This application is related to U.S. patent application Ser. No. 15/609,938, titled "Unsupervised Method for Baselining and Anomaly Detection in Time-Series Data for Enterprise Systems", and U.S. patent application Ser. No. 15/902,830, titled "Optimization for Scalable Baselining Using Time-Series Models", the entire contents for each of which are incorporated by reference.

TECHNICAL FIELD

The present disclosure relates to techniques for defining and executing multi-step processes in computing environments. In particular, the present disclosure relates to orchestrating topology aware and parallel execution of multi-step recipes with integrated anomaly detection and log analytics.

BACKGROUND

System administrators are often responsible for managing numerous complex services at a large scale. For example, a single administrator may be responsible for managing hundreds of thousands of instances of a cloud service. Each service may involve a diverse set of entities, such as applications, webservers, database, hosts, virtual machines (VMs), operating systems, filers, routers, cloud resources, etc. An "entity" or "target" in this context refers to any computing resource, including hardware and software, that can be managed or monitored.

Many management operations involve executing tasks on a large number of entities. For example, a patch operation may be applied to several different database servers that each support one or more instances of a cloud service. Adding to the complexity, applications and services often consist of different entity types. A high-level management operation may involve multiple steps, with each step run against a large set of entities. In some cases, one step in the management operation may need to wait for the preceding step to complete due to dependencies. For instance, to properly shut down a service, the system administrator may need to ensure that a set of instances of a software application are shut down first, followed by instances of a database server, followed by a database host. Failure to follow the proper sequence may lead to runtime errors and/or data corruption.

Management operations are further complicated by the dynamic nature of large scale applications and cloud services. New entities may be added or removed at any time, in matter of hours or days. In addition, relationships among entities for a given application or service may be in a constant state of flux. Such frequent changes increase the risk that a system administrator may overlook running a step of a management operation on one or more entities. In severe cases, such neglect may lead the application or service to be exposed to security vulnerabilities, performance degradation, and/or outages.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
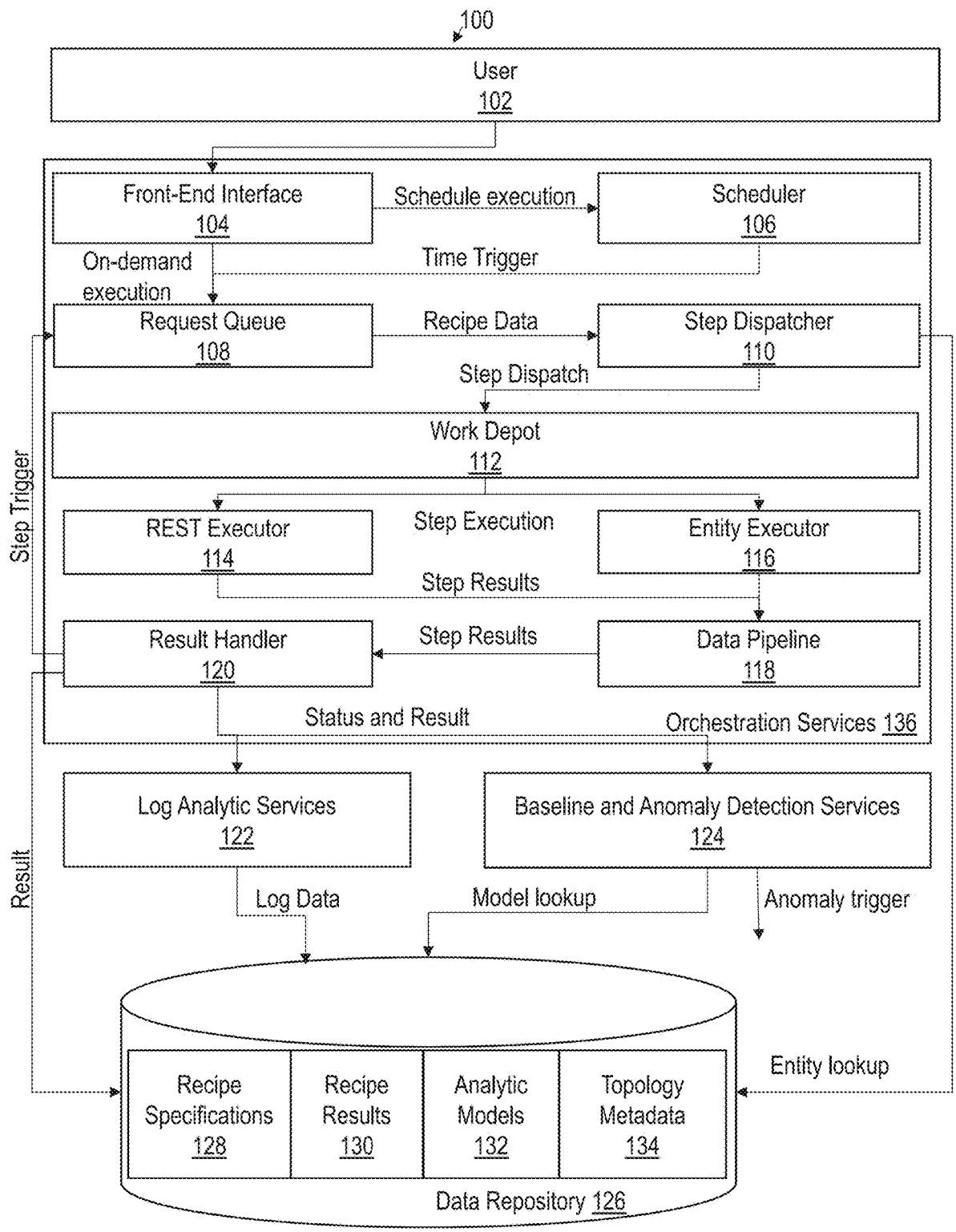
FIG. 1 illustrates a system for orchestrating recipe composition and execution in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. RECIPE COMPOSITION AND SUBMISSION
4. MULTI-LEVEL PARALLEL EXECUTION
5. TOPOLOGY-AWARE RECIPE EXECUTION
6. FLEXIBLE COMPENSATING ACTION TRIGGERS
7. ANOMALY DETECTION AND LOG ANALYTICS
8. COMPUTER NETWORKS AND CLOUD NETWORKS
9. MICROSERVICE APPLICATIONS
10. HARDWARE OVERVIEW
11. MISCELLANEOUS; EXTENSIONS

1. General Overview

Techniques relating to an orchestration framework and service are described herein. In one or more embodiments, the orchestration framework and service provide a declarative language for composing and chaining asynchronous, multi-step recipes. A "recipe" in this context is a workflow comprising a sequence of executable steps, where each step may be run on one or more entities to perform a specific pattern of activity on a system or set of systems. For example, a recipe may be defined to perform a variety of management and maintenance operations on a complex application or service including, but not limited to, system migration, upgrade, scale-up, scale-down, and shut down operations. Additionally or alternatively, the declarative syntax may be used in other contexts, such as to run custom multi-step applications or services using the underlying target entities of an existing complex application or service.

In one or more embodiments, the orchestration service provides a framework through which a user may construct a multi-step recipe/workflow orchestration system. For example, the framework may include composition tools and interfaces that allow a user to define recipe specifications. Each recipe specification may be a structured file or data object that defines executable actions to perform for each step of a recipe. As described further herein, recipe specifications may be defined through a declarative language, although other programming languages may also be used.

In one or more embodiments, recipe specifications define multiple levels of execution. (The term "recipe specification" may be used interchangeably with "action specification", "action sequence specification", "process sequence specification" or "workflow specification"). Parallelism may be managed independently at each separate level of execution. For example, a recipe specification may support declarative two-level parallelism for a workflow: one at the recipe level and another at the step level. A runtime engine responsible for executing a recipe specification may instantiate a plurality of parallel recipe-level workers, with each worker executing a sequence of steps defined in the recipe specification. Each recipe-level worker may instantiate a plurality of step-level workers, with multiple step-level workers executing the same step in parallel. Implicit parallelism may be used as part of the declarative syntax of the recipe specification. Implicit parallelism facilitates declarative multi-level parallelism by avoiding the need to define explicit forks and joins. Strict sequential order may be maintained across steps associated with a recipe-level worker to simplify the dependent step specification and execution.

In one or more embodiments, recipe specification allows for flexible triggering points for invoking compensating actions for failure handling. Example compensating actions may include rollback and/or cleanup operations. In order to provide flexibility, the orchestration framework may allow triggering points to be defined at different stages of processing the recipe at various levels of execution. For a given triggering point, a recipe specification may define pre-processing, post-processing, filtering, and/or failure handling. The user may thus incorporate checks at various stages of a recipe's execution to address any failures or other problems.

In one or more embodiments, the orchestration framework provides anomaly detection and log analytic services. During recipe runtime, one or more metrics may be collected from the recipe-level and/or step-level workers. These metrics may be logged and/or analyzed during and/or after runtime to detect anomalies and other events. The metrics may span multiple executions of a recipe and executions of different recipes for the same application or service. The anomaly and log analytics may help users isolate the root cause of problems encountered during recipe execution.

2. System Architecture

An orchestration service as used herein refers to a set of one or more applications or cloud services through which one or more of the techniques described herein may be implemented. In one or more embodiments, the orchestration service is implemented as an asynchronous message processing system. Components (also referred to as microservices) of an asynchronous messaging system may be publishers or consumers of a queue. Components may perform batch processing whenever possible to decrease execution times and boost performance.

FIG. 1 illustrates example asynchronous messaging system 100 for orchestrating recipe composition and execution in accordance with one or more embodiments. As illustrated, system 100 includes orchestration services 136, log analytic services 122, baseline and anomaly detection services 124, and data repository 126. Each service may comprise various components that consume or publish messages as described further herein. The components illustrated in FIG. 1 are provided for purposes of explanation. However, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Components of system 100 may correspond to different phases during recipe execution. The first phase is the work dispatch phase, which may include the following components: front-end interface 104, scheduler 106, request queue 108, and step dispatcher 110. In the work dispatch phase, requests to execute one or more recipe specifications are received and processed. Execution may be requested on-demand or at a scheduled time in the future.

Front-end interface 104 manages interactions between system 100 and user 102. A user in this context may be a human user, such as a system administrator, or another application/service. Front-end interface 104 may present or otherwise provide an interface through which recipes may be composed and executed. For example, front-end interface 104 may provide a graphical user interface (GUI), a command-line interface (CLI), and/or an application programming interface (API) to user 102. Front-end interface 104 may be implemented as a web service that accepts recipe submissions, including scheduled submissions. When a recipe is submitted, front-end interface 104 may create a new submission entity in data repository 126. The recipe specification and any metadata associated with the request may be persisted within the submission entity. If a recipe submission is on-demand, front-end interface 104 enqueues a message in request queue 108. Scheduled submissions are provided to scheduler 106.

Scheduler 106 provides a timer for scheduled submissions. The time may be a countdown time that triggers a message after a specified amount of time has lapsed. For example, user 102 may request that a recipe specification be executed after a specified number of hours or days have passed. Additionally or alternatively, the timer may trigger the message at a specified date and time. In this scenario, user 102 may specify the date (e.g., day, month year), and time to begin execution of the recipe specification.

Request queue 108 stores messages to execute recipes in the order received from front-end interface 104 and/or scheduler 106. For example, a request to execute a recipe specification on-demand may immediately be enqueued in request queue 108. Scheduled requests are enqueued responsive to the time trigger generated by scheduler 106.

Step dispatcher 110 asynchronously consumes messages stored in request queue 108. For a given recipe submission, step dispatcher 110 may perform one or more of the following operations:

- Perform metadata look up for topology aware execution;
- Split the execution into multiple recipe-level workers, if appropriate, and join all recipe-level workers to determine the final execution status of the entire execution;
- Split step execution into multiple step-level workers, if appropriate, and join all step workers for a given step before proceeding to next step;
- Trigger execution of all stages of a step such as pre-processing, post-processing, compensating actions for handling failures, and retries, which may use the timer of scheduler 106;
- Prepare input values for variables and parameters declared in a recipe specification;
- Consolidate output values and results, persisting these values in data repository 126; and/or
- Summarizing execution statistics at various levels (e.g., individual step worker, global step consolidated across multiple step workers, individual recipe-level worker, global recipe consolidated across multiple recipe-level workers).

When execution of a recipe specification is split across multiple recipe-level workers, each recipe-level worker may operate in parallel and perform one or more of the tasks listed above. Each recipe-level worker may thus act as a step dispatcher that manages execution of steps for a different instance of the recipe.

Work depot 112 corresponds to the messaging phase of the recipe execution process. In one or more embodiments, work depot 112 is a database-backed queue that stores work orders, including step execution instructions. Work depot 112 may expose external representational state transfer (REST) endpoints so that step executors, including those executing in other cloud services, may retrieve work orders. Multiple step executions across REST endpoints or entities may be batched and stored in one work order.

During the execution phase, one or more step executors execute steps defined in the submitted recipe specification. There may be different step types and each step type may be handled by a corresponding step executor, such as REST executor 114 and entity executor 116. Each step executor listens to work orders from work depot 112, executes the particular work order, and pushes the results downstream for result processing.

REST executor 114 is a step executor that makes outbound connections to web services, such as Amazon Web Services (AWS), Microsoft Azure, Oracle Public Cloud, etc. REST executor 114 may use proxy servers and retrieve any credentials used to make outbound REST calls to external cloud services. REST executor 114 may be tuned to high network input/output (IO) processing using non-blocking IO for higher throughput and better resource utilization. REST executor 114 may also handle various exceptions that may arise when invoking REST calls to a web service.

Entity executor 116 is a step executor that runs on a host that is directly accessible, such as on a host inside a virtual private cloud or datacenter environment. Entity executor 116 may resolve any credentials for executing a step. Entity executor 116 may run any host-based scripts against an entity, such as standard query language (SQL) scripts against a target database system. Entity executor 116 may have background processes and threads to perform entity-specific operations such as JDBC connection for databases. Entity executor 116 may also execute any REST endpoints.

In addition or as an alternative to the step executors depicted, other types of step executors may be deployed within system 100. For example, a compute executor may be deployed to execute arbitrary user functions. This type of executor may facilitate pre-processing, post-processing, value extraction, and consolidation. While compute step executors may execute arbitrary user functions, the step executor may be run in the cloud such that the users do not need to configure and manage the related infrastructure for running the user functions.

In the result processing phase, data pipeline 118 receives result data from each of the step executors. In one or more embodiments, data pipeline 118 is implemented as a file system that stores the step results in one or more datafiles. However, execution results may be stored in any other format, which may vary from implementation to implementation.

Result handler 120 retrieves the execution results from data pipeline 118. Result handler 120 then sends the execution status (e.g., success, failure, pending) and results to request queue 108. Step dispatcher 110 may process the results to determine the final completion status and proceed to the next step, if possible.

Result handler 120 further provides status and results to log analytic services 122, baseline and anomaly detection services 124, and/or data repository 126. In one or more embodiments, result handler provides an execution output (e.g., stdout, REST response body) with an associated execution context (e.g., submission identifier, execution identifier, entity name, start and end time, error, etc.) which may use the results to perform baselining, anomaly detection, and/or other analytics.

Result handler 120 may log the output of one or more recipe executions. For example, a log may store start times, end times, and/or other execution context for individual steps, groups of steps, individual recipes, and groups of recipe executions. Log analytic services 122 may support log searches on the output of one or more recipe executions. For example, log analytic services 122 may fetch and display logs that satisfy a set of user-specified criteria, allowing the user to analyze current and historical recipe executions.

Baseline and anomaly detection services 124 may use the status and result data to generate and evaluate analytic models. For example, baseline and anomaly detection services 124 may train a baseline model to represent an expected distribution of execution times for individual steps workers (different instances of a step), an entire step (which may contain multiple instances of the step), a recipe-level worker, etc. Incoming status and result data may be evaluated against trained baseline model to determine whether the current behavior is anomalous. If an anomaly is detected, baseline and anomaly detection services 124 may generate an alert. Responsive to the alert, one or more remedial actions may be performed. Example actions may include, but are not limited to sending/presenting a notification to user 102, stopping execution of a recipe, and/or triggering compensating actions, such as rollback, cleanup operations and.

Data repository 126 may be implemented as any type of storage unit and/or device (e.g., a file system, database, collection of tables, or any other storage mechanism) for storing data. Further, a data repository 126 may include multiple different storage units and/or devices. The multiple different storage units and/or devices may or may not be of the same type or located at the same physical site. Further, a data repository 126 may be implemented or may execute on the same computing system as one or more other components of system 100. Alternatively or additionally, a data repository 126 may be implemented or executed on a computing system separate from the other components of system 100. Data repository 126 may be communicatively coupled to other components of system 100 via a direct connection or via a network. Data repository 126 may be implemented as an external cloud service or may be part of the same service as orchestration service 136.

In one or more embodiments data repository 126 stores the following data:

- Recipe specifications 128: A recipe specification is a file or other data object that defines executable actions and input parameters for various execution levels during runtime execution of a recipe. Step dispatcher 110 may perform lookups of recipe specifications responsive to submissions received through request queue 108.
- Recipe results 130: A recipe result may include the execution output, execution context, and/or other status information for various levels of execution (e.g., step worker, global step, recipe level, recipe).
- Analytic models 132 may include trained baseline and anomaly detection models. Log analytic services may continuously or periodically update and evaluate the models using incoming execution results and status information.
- Topology metadata 134 identifies the topology of a service or application on which a recipe submission is executed. The topology metadata may be periodically or continually collected from target resources. In one or more embodiments, topology metadata identifies the specific resources/entities and relationship between resources/entities of an application or service. For instance, an instance of a database service may depend on the host machine on which it runs. A clustered database system may contain multiple database instances.

3. Recipe Composition and Submission

In one or more embodiments, orchestration services 136 allows user 102 to compose and/or submit recipes for execution. Recipes composition includes creating and editing recipe specifications. As previously described, a recipe specification may be a structured file or data object that defines executable actions to perform for each step of a recipe.

In one or more embodiments, orchestration services 136 may provide a GUI or other interface through which user 102 may compose new recipes. For example, user 102 may navigate to a menu or other GUI element and select "create new recipe" or a similar option. Upon selecting the option, a recipe template may be presented to user 102. The template may allow the user 102 to select or declare a sequence of steps. The GUI may also allow a user to specify variables and/or other parameters associated with each step. For example, user 102 may provide authentication credentials for accessing a target entity upon which the step is executed. As another example, user 102 may declare one or more output variables where step results are stored.

Based upon the input received from user 102 through a GUI or other interface, orchestration service 136 may generate a new recipe specification. In one or more embodiments, the recipe specification defines a recipe through a declarative language. Declarative languages allow for users 102 to describe what to accomplish at each step rather than how to accomplish the step. Thus, the declarative language may simplify the creation of a recipe without the need for the user to resort to more complex, imperative programming languages.

In one or more embodiments, the steps of a recipe specification may be described without being tied to a particular machine or environment. The resource against which the steps are executed may be resolved during runtime. In the event that resources are added to or removed from a cloud service, the steps of the recipe may still be executed without having to update the recipe specification. The recipe may also be flexible and pluggable, allowing for more complex code to be integrated in advanced use cases to allow the user to extend the functionality of a recipe above and beyond the declarative syntax supported by orchestration service 136.

A user may define various types of executable actions for a corresponding recipe step. Example executable actions may include, without limitation, patching a software binary, modifying identity and access management (IAM) policies, migrating data between different network hosts, updating security settings, changing system configurations, performing RESTful calls to a web service, starting a resource, provisioning a resource, stopping a resource, and deprovisioning a resource. A recipe specification may string together multiple executable across several different resource types. For example, a recipe specification for upgrading a cloud service may apply a patch to a software binary executing on an application server, provision additional web servers, and migrate data to a new version of a database. As another example, a recipe specification for bringing down a cloud service may stop a set of database servers, application servers, and web servers. The number and types of steps performed may vary from one recipe to the next.

In one or more embodiments, recipe steps may be selected from a set of pre-defined steps. For example, data repository 126 may maintain a library of executable steps/actions that are available for incorporation into a recipe specification. A user may browse or search for steps using a GUI and add the steps to the recipe specification in a desired order.

In addition or alternatively, recipe steps may be defined arbitrarily. For example, a recipe specification may support user-defined logic that conforms to a programming language syntax, such as the Java or any other programming language syntax. User-defined functions may be triggered at multiple stages for a single step and/or other levels of execution. For example, a user-defined function may be triggered to perform a compensating action as described in further detail below. Additionally or alternatively, a user-defined function may be incorporated as a step type within a recipe specification. Thus, a recipe specification may include both system-defined and user-defined step types.

In one or more embodiments, recipe specification may be stored in a recipe library. When stored in a recipe library, a recipe specification may be referenced by other recipe specification. For example, recipe specification RS1 may be a multi-step workflow for performing an orchestration operation, such as a scale-out or upgrade. The recipe specification may be referenced by one or more other recipe specifications, allowing for recipe chaining and nesting. For instance, recipe specification RS2 may reference RS1 to call the recipe and execute the multi-step workflow for performing the orchestration operation.

In one or more embodiments, a recipe specification defines variables as inputs and results as output. Variables and results may correspond to a storage location of a value or data object assigned to the variable. Variable and results may be shared by different steps and/or recipe specifications. For example, the result of one step may be passed as input to another step of the same recipe or a different recipe.

Figure 2:
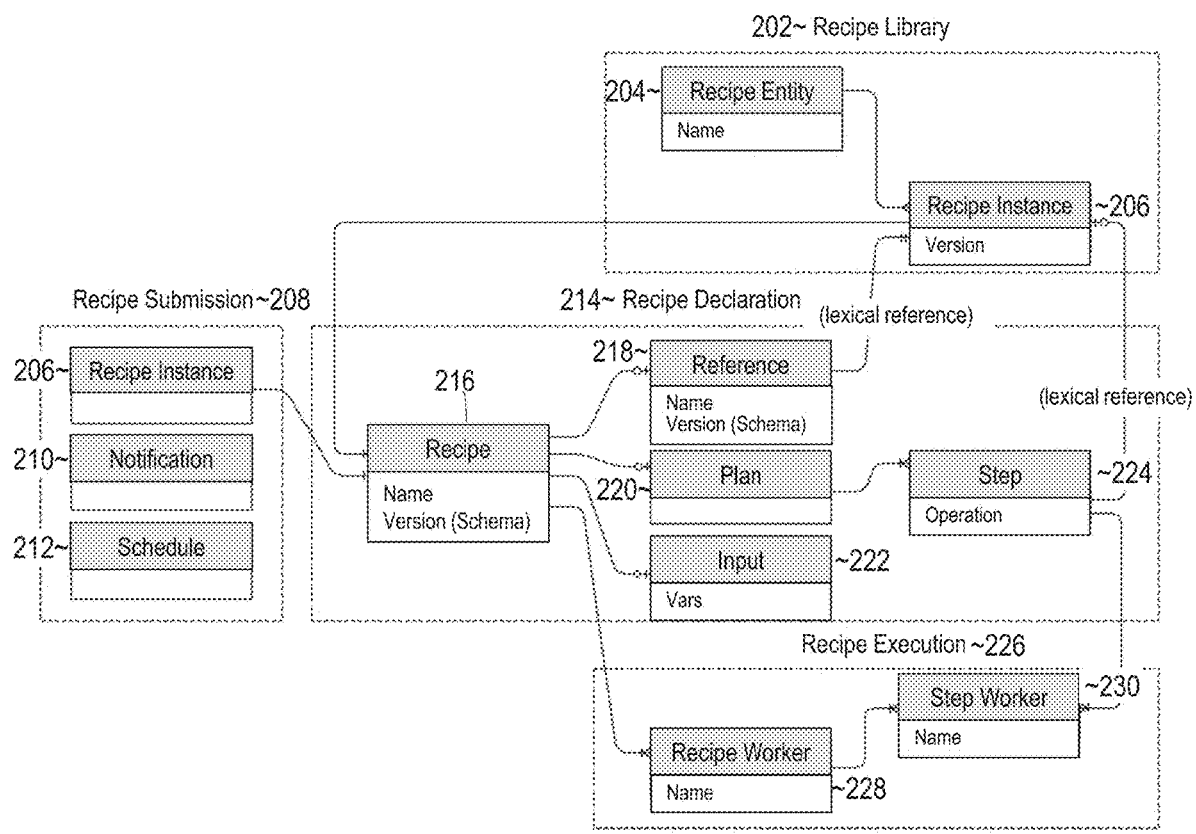
FIG. 2 illustrates an example relationship between recipe elements in accordance with one or more embodiments.

FIG. 2 illustrates an example relationship between recipe elements in accordance with one or more embodiments. As illustrated, a recipe is defined via various elements and relationships, which are described further below.

Recipe library 202 is a persistence store which provides an ability to store and retrieve recipes. Recipes can have one or more versions associated with them, can be in a published or draft state, and are accessed via a REST API. A UI for recipe management and authoring may be integrated with the recipe library. Recipe library 202 stores the following for a given recipe:

Recipe entity 204 corresponds to a recipe in recipe library 202. Recipe library 202 may store several recipe entities. However, there is one recipe entity per given unique name.

Recipe instance 206 corresponds to an instantiation or implementation of a recipe entity.

There are one or more recipe instances, referenced by version, per recipe entity Recipe submission 208 represents a concrete submission to orchestration service 136. Recipe submission 208 may request the immediate or scheduled execution of a specific recipe. In one or more embodiments, recipe submission may specify the following:

Recipe instance 206 which references a recipe specification to execute by name and version number. For instance, the following is an example recipe submission: "Run the Patch DBCS workflow version 1.1.1 on May 25, 2018" that invokes the recipe titled Patch DBCS and the associated version 1.1.1. The version of the recipe specification to be used allows for multiple recipe versions to be upgraded seamlessly. That is, a recipe specification may be upgraded while a prior version of the recipe specification is being executed. Recipe submission 208 may also be assigned a name that is different from the name of the recipe being invoked.

Notification 210 provides notifications responsive to detecting events. For example, user 102 may be notified upon recipe completion or detected anomalies. The notifications may vary from one implementation to the next and may be configurable by user 102.

Schedule 212 identifies when recipe submission 208 should be executed. In the previous example, "Run the Patch DBCS workflow version 1.1.1 on May 25, 2018", the recipe submission is scheduled for the date May 25, 2018. A recipe may also be scheduled for periodic execution, which may be useful for lifecycle and other recurring operations.

Recipe declaration 214 is where the definition of a recipe's logical execution is defined. Recipe declaration 214 may correspond to a recipe specification for one or more instances of a recipe. Recipe declaration 214 may be stored in the recipe library 202 or inline as part of recipe submission 208. Recipe declaration 214 may include the following elements:

Recipe 216 identifies a recipe entity by name and a recipe instance by version. A version corresponds to a schema version of a recipe's plan.

Reference 218 is a lexical reference to a recipe instance, such as recipe instance 206, in recipe library 202. Reference 218 may be omitted if the recipe specification is included inline with recipe submission 208

Plan 220 describes the steps and the input for recipe 216. A plan may be associated with a recipe plan name (e.g., "Patch DBCS") and a schema version.

Input 222 references one or more input variable for plan 220. An input variable may be used to process one or more steps in the plan as previously described.

Step 224 represents a step within plan 220. Step 224 may be associated with an operation stage which defines the step operation (e.g., RESTful call, execution on a target entity). Step 224 may be associated with zero or more trigger points, which are optional stages defined as part of the step execution flow. The optional trigger point stages include before, pre, post, after, and publish, as described in further detail below.

Recipe execution 226 represents the execution stage for recipe 216. Recipe execution 226 includes the following elements:

Recipe worker 228 is a process or set of processes that manage one instance of recipe 216. Recipe execution 226 may have one or more recipe workers (also referred to as recipe-level workers) with each recipe worker managing a different instance/execution of recipe 216.

Step worker 230 is a process or set of processes that manage execution of a step within recipe 216. A given step in a recipe may be executed on one or more target resources, depending on the topology of a system. Multiple step workers may be instantiated to manage different executions of a step in parallel, as described in further detail below.

Figure 3:
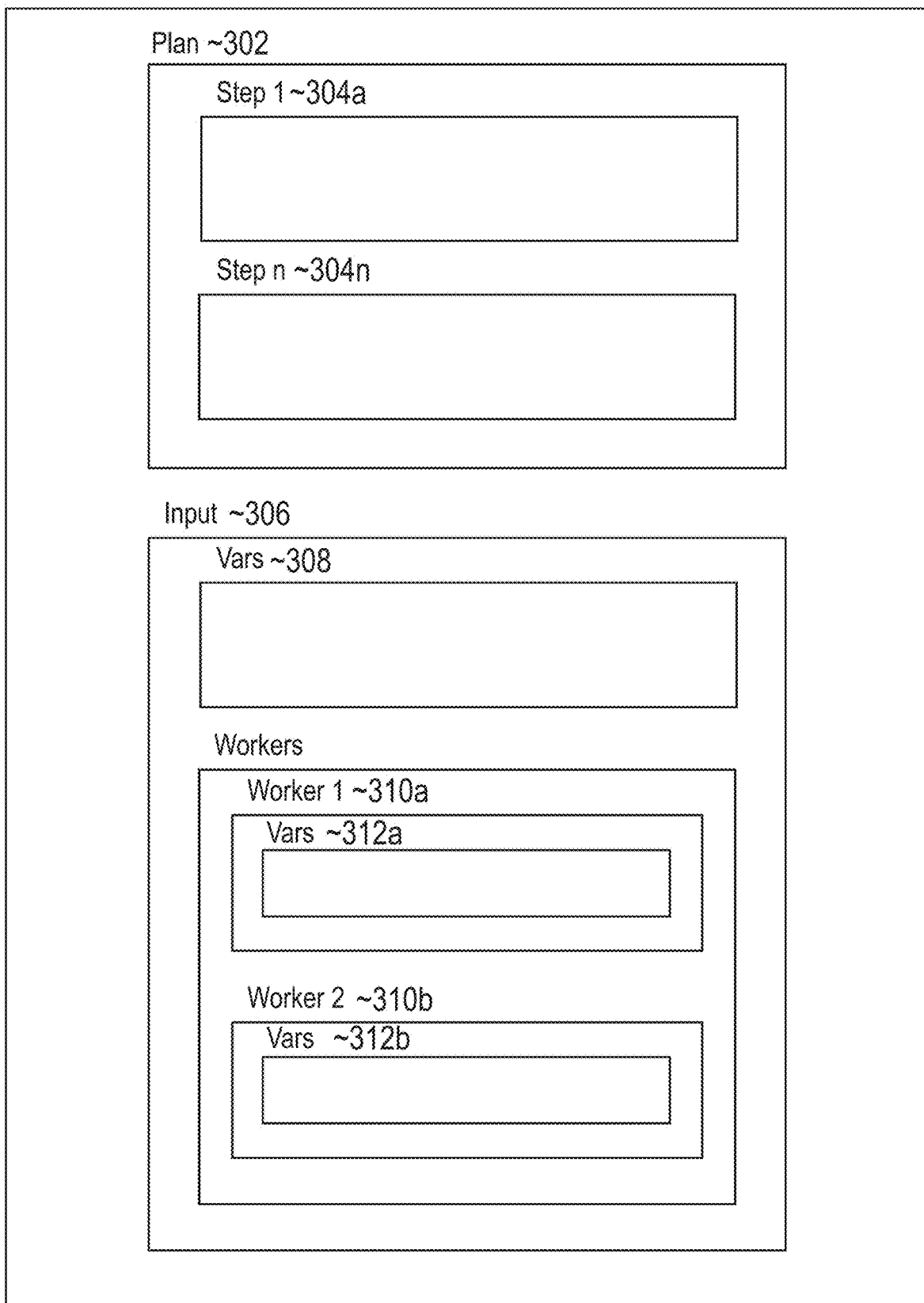
FIG. 3 illustrates an example structure of a recipe specification in accordance with one or more embodiments.

FIG. 3 illustrates an example structure of a recipe specification in accordance with one or more embodiments. The recipe specification defines a plan comprising multiple steps. A set of input variables are defined for the recipe and steps. Recipe specification further defines the number of recipe-level workers to instantiate during runtime. In other cases, the number of recipe-level workers may be implicitly derived rather than explicitly declared.

The template for a recipe specification as depicted in FIG. 3, has the following structure:

Recipe specification
  Plan
    Steps
      {step name} e.g., step-1
        Step definition
      {step name} e.g., step-2
        . . . .
    . . . .
  Input
    Vars # runtime parameters for the recipe template
      <name1><value1>
      . . . .
    Workers (recipe level n-array input}
      {recipe-worker-name}
        Vars
          <name1>:<value1>
        . . . .
      {recipe-worker-name}
        Vars
          <name1>:<value1>
        . . . .

In one or more embodiments, recipe specification 300 is expressed as one or more files conforming to a markup language format, such as javascript object notation (JSON) or YAML files. Recipes files may be persisted in recipe library 202 or as an inline recipe submission. A JSON, YAML, or similar data structure may define a single workflow/plan according to the structure described below.

Recipe specification 300 includes the following elements:
Plan 302 defines steps 304*a-n*, which may correspond to any of the executable actions previously described; and
Input 306 which defines input variables (vars 308) and worker-level processes (workers 310*a-b*).

Each worker-level process is also associated with input variables (vars 312*a-b*). These input variables may be unique to the worker-level process while vars 308 may be global. For example, worker 310*a* may be configured to execute plan 302 in a development environment and worker 310*b* may be configured to execute plan 302 in a test environment. The worker-level variables (vars 312*a-b*) may include variables corresponding to the different environments.

4. Multi-Level Parallel Execution

Responsive to a recipe submission, orchestration services 136 processes the recipe according an execution model. In one or more embodiments, the execution model allows for any level of serial and parallel actions to be combined. Parallel executions may be implemented at various levels of a recipe. For example, multiple instances of a recipe may be executed in parallel. For each instance of a recipe execution, multiple instances of a step may be executed in parallel. Recipe steps may reference other recipes, thus allowing for component/modularization of workflows to occur, and for administrators to build up any manner of complex activities from smaller, well-defined recipe building blocks.

In one or more embodiments, the characteristics of the recipe execution model are as follows:

A recipe may instantiate one or more recipe workers—the number of recipe workers defines the level of parallelism for the entire recipe.

Each recipe worker runs its own instance of the recipe in parallel. There is no "crosstalk" or synchronization of data between recipe worker instances.

Each recipe may have one or more steps.

Each step runs in serial with every other step in the same recipe plan.

Each step may have one or more step workers.

Each step worker runs its own instance of the step in parallel. There is no "crosstalk" or synchronization of data between other step instances.

Steps may combine the results of all completed steps per step worker into one single result (via the step level after stage).

Recipes may combine the results of all completed recipe instances into one single result (via the recipe level after stage).

Recipes may publish the results of the entire recipe. The published results of one recipe may be used during nested recipe execution, as described further below.

Figure 4:
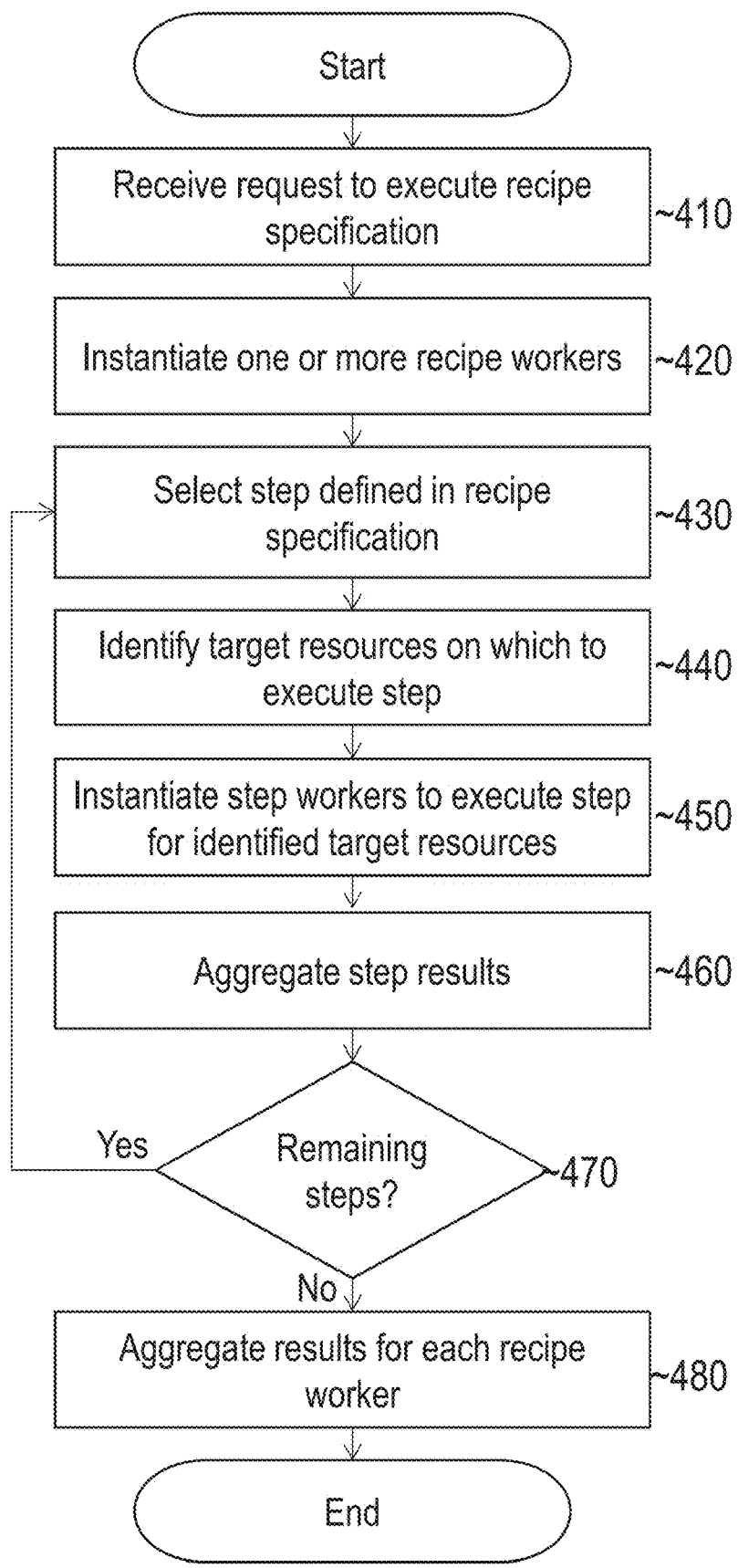
FIG. 4 illustrates an example set of operations for executing a recipe in accordance with one or more embodiments.

FIG. 4 illustrates an example set of operations for executing a recipe in accordance with one or more embodiments. The set of operations comprises receiving a request to execute a recipe specification (Operation 410). The request may be a scheduled or on-demand submission as previously described.

Responsive to receiving the request, a set of one or more recipe workers are instantiated, ether on-demand or at the scheduled execution time (Operation 420). In one or more embodiments, the number of recipe workers that are instantiated are based on the input parameters specified in the recipe specification. In some cases, the number of recipe workers may be determined based on the number of systems across which the recipe is executed. For example, a recipe may be defined to perform a service upgrade. The recipe may be executed across multiple different systems/environments, such as a production system, a test system, a staging system, etc. A separate recipe worker/process may be instantiated to manage execution of the recipe steps on each separate system. The recipe workers may be executed in parallel on the same and/or different hosts.

After the recipe workers have been instantiated, each separate recipe worker may manage execution of the steps defined in the workflow on a separate system. In order to manage execution of the steps, the recipe worker/process selects a step defined in the recipe specification (Operation 430). The steps may be executed serially in the order specified in the recipe specification.

Once a step has been selected, the process identifies one or more target resources on which to execute the step (Operation 440). For example, a patching operation may be applied to a single software resource or to multiple software resources. Similarly, other operations may be spread across a single entity or multiple entities. In one or more embodiments, the process may use the topology metadata to identify the target resources on which to execute the step. Examples for processing topology metadata are provided in the section below. This approach allows the runtime engine to react to changes in the underlying topology without the any change to the recipe specification. In other cases, the recipe specification may explicitly identify the targets on which to execute the step.

The set of operations further comprises instantiating a set of step workers to execute steps for the identified target resources (Operation 450). In one or more embodiments, a separate step worker is instantiated to manage execution for each of the identified target resources. For example, if a patch is being applied to n different software resources, then n step-level workers may be instantiated, with each step worker applying the patch to a different resource. In other cases, a single step process may apply a step to multiple target resources or multiple step works may be assigned to apply the step on the same target resource.

The set of operations further comprises aggregating the results from the instantiated step workers. (Operation 460). For example, the status of each step worker may be aggregated to determine whether any of the step-workers failed. The aggregated results may be used to determine whether to trigger compensating actions at one or more trigger points, as described further in Section 6, titled FLEXIBLE COMPENSATING ACTION TRIGGERS, below. Aggregation functions (e.g., summation, averaging, user-defined function, etc.) may also be applied at this step to combine one or more step results.

After execution of the step is complete, the recipe-level instance managing the step determines, from the recipe specification, whether there are remaining steps to execute. (Operation 470). If there are remaining steps to execute, then the process returns to operation 430, and executes the next step in the sequence. Otherwise, step processing of the instance of the recipe is complete.

The set of operations further comprises aggregating results across recipe workers (Operation 480). As previously indicated, each recipe worker may manage execution of the recipe on a separate system or set of systems in parallel. As with step workers, completion times between different recipe workers/instances of the recipe may vary. At the end, the process may aggregate results similar to described above for the step level, albeit at a higher, recipe level.

Figure 5:
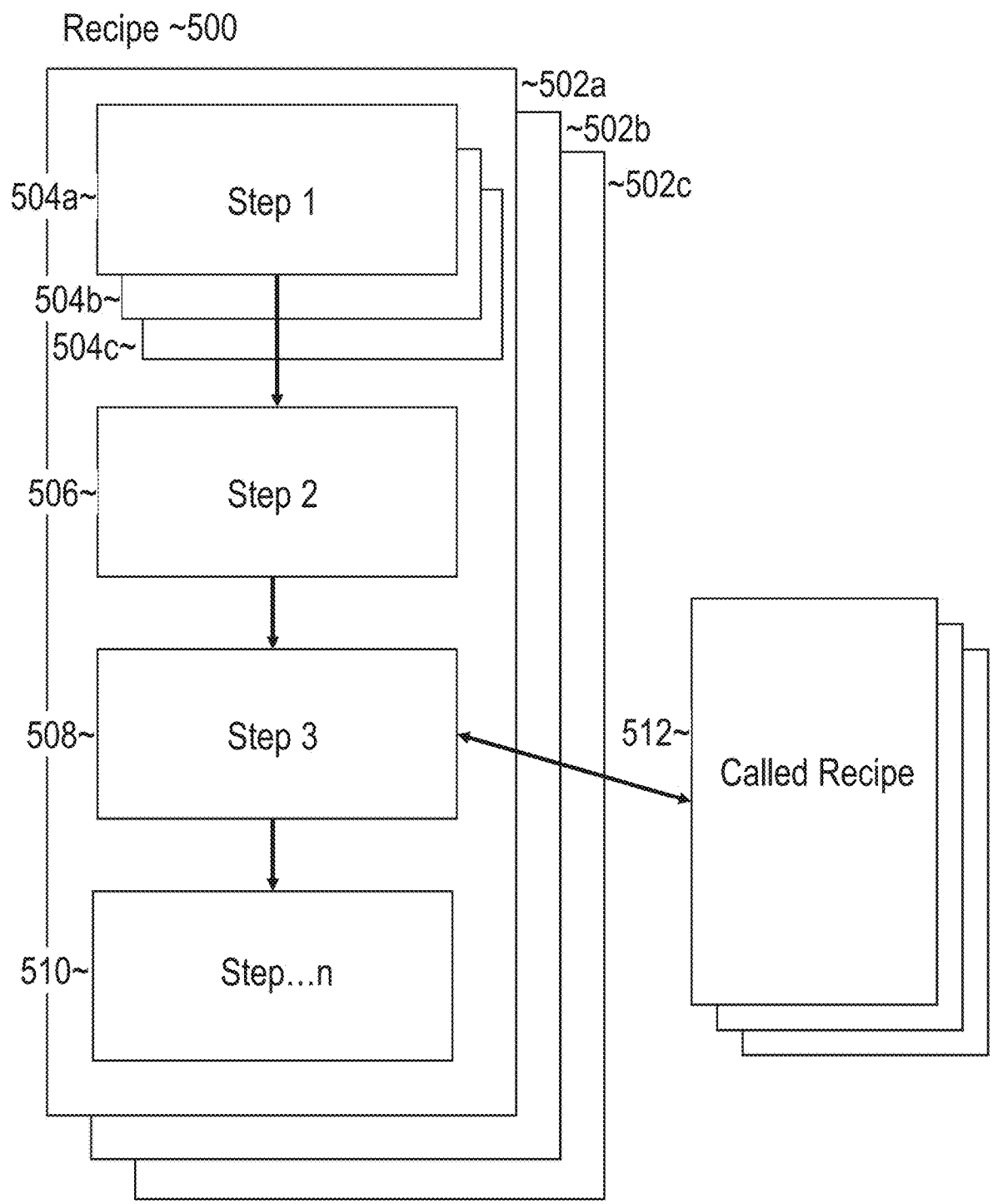
FIG. 5 illustrates an example set of processes for executing instances of a recipe and recipe steps in parallel, in accordance with one or more embodiments.

FIG. 5 illustrates an example set of processes for executing instances of a recipe and recipe steps in parallel, in accordance with one or more embodiments. As illustrated, recipe worker instances 502a-c execute the steps of recipe 500 in parallel. Each recipe worker instance may instantiate a plurality of step worker instances that attempt to execute different instances of the steps in parallel.

For a given instance of a recipe, a plurality of step workers instances attempt to execute instances of each step in parallel. Referring to FIG. 5, for instance, step instances 504a-c execute in parallel. In one or more embodiments, step instances 504a-c are executed against different target resources. For example, a cloud service may be supported by a plurality of database systems. Each of step instances 504a-c may manage updating a software binary for a different instance of a database system.

In one or more embodiments, different steps are executed serially/sequentially. For example, step 506 (including any associated instances running in parallel) is executed after completion of step instances 504a-c Similarly, step 508 is executed after all instances of step 506 that belong to the same recipe instance are complete, and step 510 is executed after all instances of step 508 that belong to the same recipe instance are complete. The steps of the recipe specification may thus be executed sequentially without the need to declare any explicit join or fork operations.

In one or more embodiments, different target resources are specially configured to execute step instances of a particular type. For example, database systems may be specially configured to execute certain actions, such as SQL queries and other database commands. Other types of target resources may support step instances of different types. For example, a web server may support processing HTTP requests. In other cases, different instances of the same step may be executed differently based on target type. For example, stopping a database listener may involve a different process than stopping a database server, which may involve a different process than stopping a web server. A step that stops targets across different target types may be translated by the runtime engine to be executed according to the target types on which the different instances of the step is run. For example, a step worker stopping an instance of a database may issue database-specific commands to stop the database. Another step worker operating in parallel may operate listener-specific commands to stop a listener application. The recipe specifications may thus allow the user to define recipes without specific knowledge of the syntax for each underlying system.

As illustrated in FIG. 5, steps may call other recipes. For example, step 508 calls recipe 512. A recipe that is called by a step of another recipe is referred to as a "nested recipe". When a step worker calls a nested recipe, the called recipe may execute in the same manner. That is, a set of one or more recipe-level workers may be instantiated. Each recipe worker may execute in parallel and instantiate one or more step level workers to execute each step of the called recipe. This approach allows for massive parallel execution. If the nested recipe calls another nested recipe, for instance, then additional workers are instantiated. As a result, several different workers all operate in parallel at various levels of execution.

In one or more embodiments, the results of a nested recipe execution are published for consumption by the calling recipe and/or step. Referring to FIG. 5, the result of executing recipe 512 may be published. The results may be treated as the results of the step that called in the recipe. For example, step 510 may consume the results as the output for step 508. Additionally or alternatively, the calling step 508 may consume and perform further processing on the steps.

For example, step 508 may execute an action contingent on the results of the nested recipe execution.

Nested recipes may be defined according to the declarative syntax without the need to define explicit forks or joins. For example, call function may be declared for a given step element, whereby the call function identifies the nested recipe by name and version number. A called recipe may also call other nested recipe, resulting in multiple levels of execution and parallelism.

5. Topology-Aware Recipe Execution

In one or more embodiments, a runtime engine (also referred to herein as an execution engine) is configured to account for topology during recipe execution. As previously indicated, topology refers to relationship among entities for a given application, service or system. For example, an application instance may depend on the host on which it runs and a database instance to store data. As another example, a clustered database may contain multiple database instances. These relationships may be captured by topology metadata that is periodically or continuously collected from the target entities. Recipe authors do not need to be aware of relationship topologies, which may be subject to frequent changes, as the runtime engine is configured to resolve recipe execution against the collected topology metadata.

As previously indicated, topology metadata generally describes the resources and resource relationships within a system. Thus, topology metadata that is collected may vary from one system to the next. In one or more embodiments, the topology metadata includes a set of resource identifiers (nodes) and a set of dependencies between the resources (edges). The resource identification information may include, without limitation, hostname, network address, resource type, operating system (OS) name, and OS version. The dependency information may include, without limitation, connection information that links one node to another and direction information that indicates which resource is dependent on the other. For example, two distinct VM instances may be connected, where one is dependent on the other. In this scenario, the dependent VM instance relies on the other VM instance to be fully functional before the dependent resource may function properly.

Figure 6:
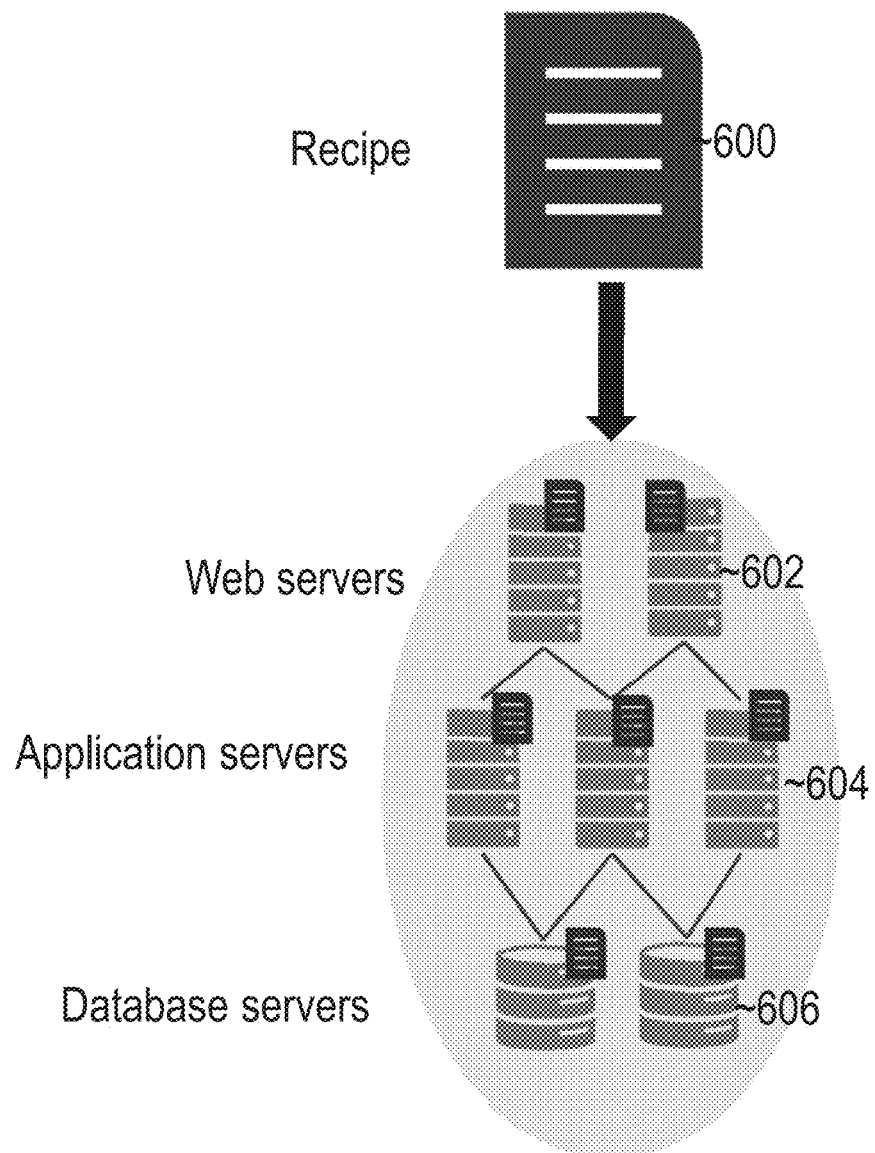
FIG. 6 illustrates an example topology that may be accounted for during recipe executions, in accordance with one or more embodiments.

FIG. 6 illustrates an example topology that may be accounted for during recipe executions, in accordance with one or more embodiments; As illustrated, recipe 600 may be run on a multi-tier application service or system. A multi-tier application may include, but is not limited to, a presentation tier comprising web servers 602, an application tier comprising application servers 604 and a data tier comprising database servers 606. A web server may depend on one or more application servers, which may depend on one or more databases. The dependencies and entities may vary from system to system. The topology metadata may capture dependencies between different tiers of a multi-tier application.

In one or more embodiments, a runtime engine determines the degree of parallelism based on the topology of a system. For a given step, the runtime engine may analyze collected topology metadata to determine how many target entities are included in a system against which the step should be executed. For example, a step for upgrading a service may include a step for patching a software binary in a clustered system. The runtime engine may parse the topology metadata determine how many software binaries have been deployed in the clustered system and which nodes contain the software binary. Step dispatcher 110 may then instantiate step-level processes for each software binary on the corresponding node containing the software binary.

In one or more embodiments, changes in system topology may be accounted for without having to edit or otherwise modify a recipe. For example, a ride sharing application may be scaled up by adding more web servers, application servers, and/or database servers. As additional resources are added to the topology, step dispatcher 110 may instantiate a greater number of step-level workers to manage execution of steps on those resources, thereby increasing the degree of parallelism during recipe execution. If resources are scaled back, then the number of step-level workers that are instantiated during recipe execution may be reduced.

Figure 7:
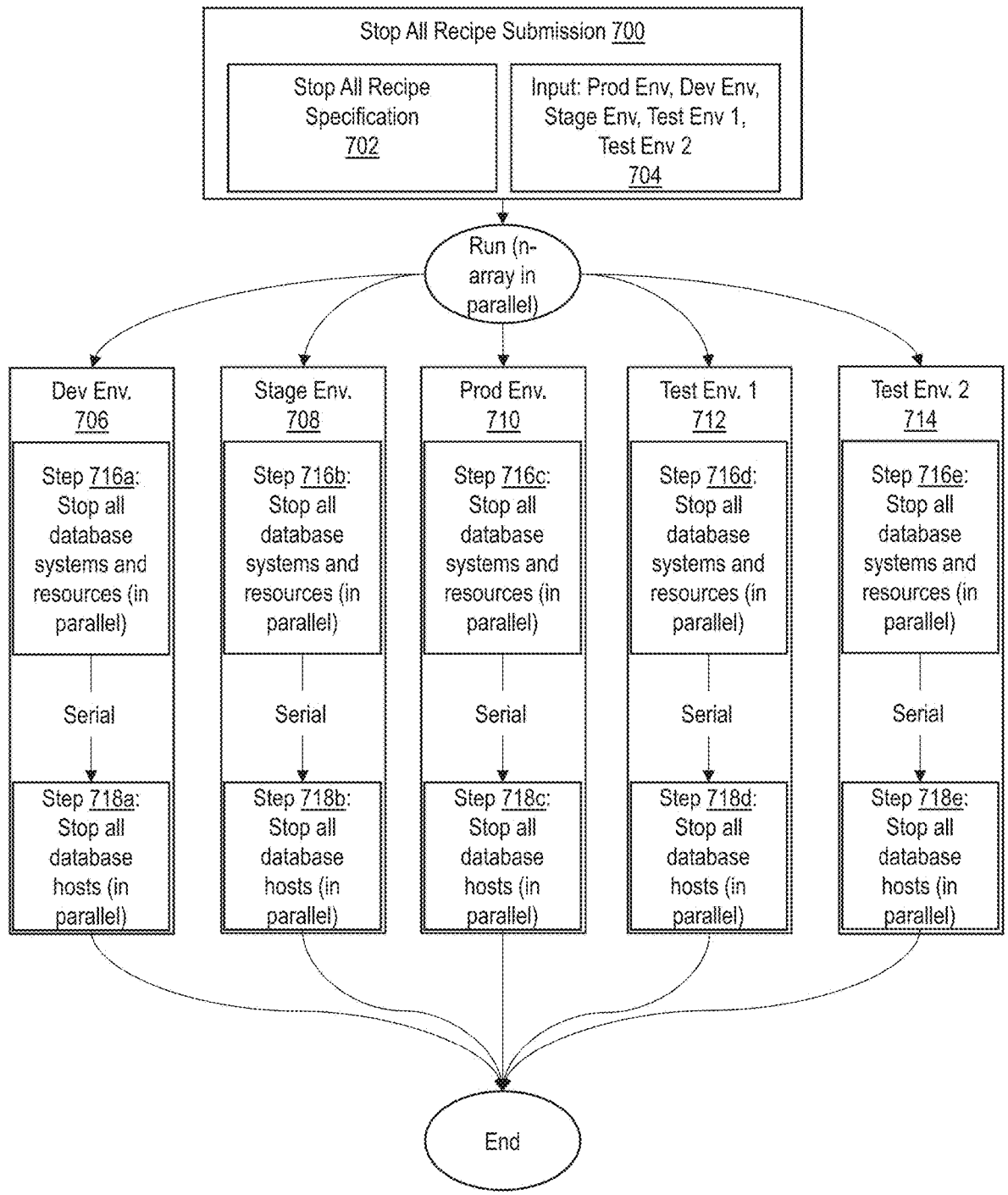
FIG. 7 illustrates an example flow for executing multiple instances of a recipe across several different systems environments, in accordance with one or more embodiments.

FIG. 7 illustrates an example flow for executing multiple instances of a recipe across several different systems environments, in accordance with one or more embodiments. Recipe submission 700 is received that includes recipe template 702 defining a series of steps for stopping a service. Recipe submission 700 further includes input variables 704 that specify the systems on which to execute the recipe. In the illustrated example, the systems include development environment 706, stage environment 708, production environment 710, test environment 712, and test environment 714. Based on the input parameters, a plurality of recipe workers are instantiated. In the example illustrated, one recipe-level worker manages recipe execution to stop a cloud service on each of the different system environments. The recipe-level workers may manage the separate recipe executions independently, with no cross-talk, and in parallel.

During recipe execution, the recipe-level workers instantiate one or more step-level workers for each step defined in recipe template 702, which include, for each environment, a first global step execution stage (steps 716a-e) and a second global step execution stage (steps 718a-e). The number of step-level workers may vary from one recipe instance to the next depending on the system topologies. For example, production environment 710 may have more databases and/or listeners then development environment 706. In this case, more step-level workers may be instantiated for step 716c by the recipe-level worker managing production environment 710 than for step 716a by the recipe-level working managing development environment 706. The number of step-level workers instantiated for steps 718a-e may also vary depending on how many database hosts are deployed within each environment.

Execution of a recipe may be performed based on the dependencies of entities in a group. For example, during a shutdown operation, the runtime engine may execute a step to shutdown non-dependent entities first. In the example illustrated in FIG. 7, for instance, the database servers and listeners are stopped first by a set of step-level workers executing in parallel. Once complete, the database hosts are stopped by another set of step-level workers executing in parallel. This sequence helps prevent errors that may occur in a dependent entity when a non-dependent entity, such as host machine, is stopped first. The step sequence may similarly be determined for other operations (e.g., patching, migration, etc.) based on dependencies. The runtime engine may determine the dependencies from the edges maintained in the topology metadata.

In one or more embodiments, the orchestration framework allows users to specify different groups in a recipe specification. A group may be specified with reference to one or more group characteristics. Example group characteristics may include, without limitation, target type, platform, and version information. For example, a user may group all database systems that execute on a particular platform and share a particular version together. In other cases, the user may group all web servers regardless of platform and version information together. The grouping may thus be highly configurable based on a variety of characteristics.

In one or more embodiments, the runtime engine automatically resolves group membership during recipe execution. The runtime engine may resolve the group metadata by parsing and analyzing the topology metadata to identify resources that match the membership criteria for the group. For example, the runtime engine may search for resources of a particular resource type that are included in a system topology. As another example, the runtime engine may search for resources that execute on a particular platform. The criteria may be based on any individual or combination of characteristics described by a system topology. Accounting for the current topology allows the runtime engine to adapt to changes in the group, including additions or removal of entities between time of a recipe submission and a scheduled execution.

The implementation for a given step may vary from one resource to the next. For example, patching a software binary on one platform may involve a different executable process than patching a software binary on another platform. In one or more embodiments, the runtime engine may use the topology metadata to determine what step implementations to perform for a given step. For instance, the runtime engine may determine topology characteristics, such as the OS name and OS version, for each entity in a group on which the step is to be executed. A mapping between the characteristics and a corresponding step implementation may be maintained in a look up table or other data object. The runtime engine may perform a lookup using the characteristics for a given entity to find the corresponding step implementation. The runtime engine may dispatch the identified step implementation to a step-level executor for execution. Step-level workers that are operating in parallel may execute different step implementations for the same step to accommodate differences in the resources against which instances of the step are being executed.

6. Flexible Compensating Action Triggers

In one or more embodiments, the orchestration framework provides flexible predefined mechanisms for pre-processing and/or post-processing at one or more levels of execution. The predefined mechanisms include triggering points, whereby compensating actions may be invoked and executed at various stages within a recipe execution. A compensating action in this context may include any operation that is performed before or after execution of one or more instances of one or more recipe steps.

Example pre-processing compensating actions for a given stage may include, without limitation, fetching and/or massaging input values, determining how many workers to dispatch for the stage, and/or determining whether to run, skip, or abort execution of the stage. Example post-processing compensating action may include, without limitation, merging data from multiple workers into a single result for the stage, massaging results output by a stage, publishing results for the stage, retrying a failed execution for the stage, aborting completion of the stage, and/or rolling back one or more resources to a previous state. Additionally or alternatively, arbitrary, user-defined logic may be executed during pre and/or post-processing operations, allowing for a highly customizable workflow.

As previously indicated, compensating actions may be triggered at various stages of a recipe execution. Triggering points for performing pre-processing compensation actions may include before a global recipe execution, before execution of a single instance of the recipe, before a global step execution, and/or before execution of a single instance of a step. Triggering points for post-processing compensating action may include after global recipe execution, after execution of a single instance of the recipe, after global step execution, and/or after a single instance of a step.

Figure 8:
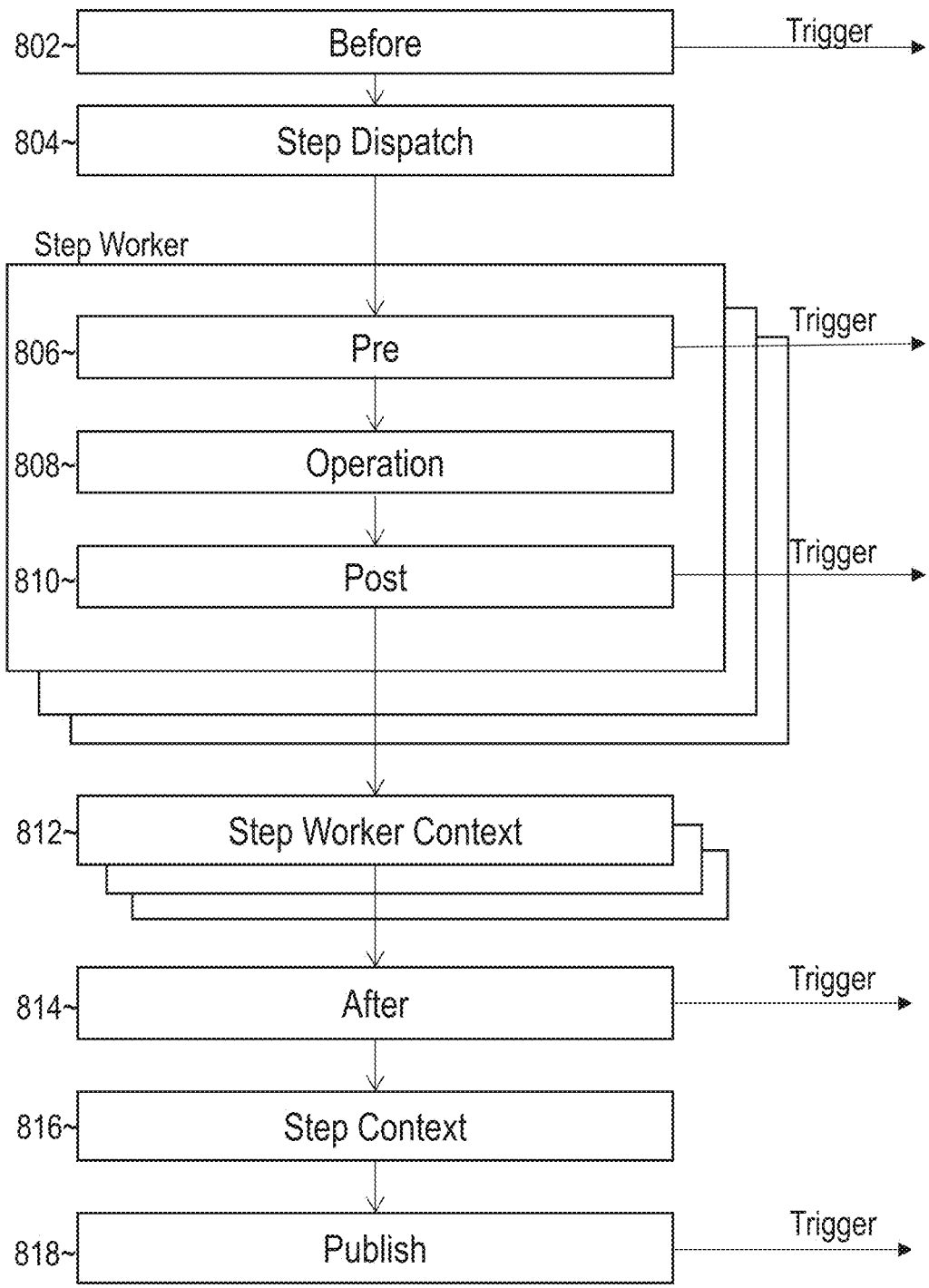
FIG. 8 illustrates an example set of triggering points for invoking compensating actions, in accordance with one or more embodiments.

FIG. 8 illustrates an example set of flexible triggering points for invoking compensating actions, in accordance with one or more embodiments. The triggering points include the following stages: before block 802, pre block 806, post block 810, after block 814, and publish block 818. One or more compensating actions may be triggered at each block depending on whether a triggering condition is satisfied.

Before block 802, after block 814, and publish block 818 are global step triggering points. A global step triggering point is evaluated once per step execution Similar triggering points may be defined at the global recipe level. A global recipe level trigging point is evaluated once per recipe execution.

Pre block 806 and post block 810 are step-level or step-instance triggering points. A step-level triggering point is evaluated once per step-level worker, which may execute in parallel. Similar triggering points may be defined at the recipe-instance level. A recipe-instance level triggering point is evaluated once per instance of a recipe execution.

In one or more embodiments, the evaluation of before block 802 is the first stage of a step execution. During this stage, step input variables may be prepared for multiple step-level workers. For example, one variable definition may be expanded into many (e.g., one per step-level worker). Additionally or alternatively, a compensating action may be triggered at this block if a trigger condition is satisfied. For instance, the step may be skipped or aborted if a previous recipe step did not complete successfully. As another example, the step may be skipped or aborted if an input value does not satisfy a threshold. The triggering conditions and compensating actions may thus vary for block 802 as well as the other blocks discussed further below.

Step dispatch block 804 instantiates a plurality of step-level workers if the step is not skipped or aborted. The expanded step input variables may be provided to the step-level work at this stage of execution. Each separate step-level worker may then proceed to pre block 806.

Pre block 806 is evaluated once per step-level worker. One or more of the pre-processing actions previously described may be performed by each step-level worker. In one or more embodiments, each step-level worker determines whether to execute, skip, or abort the instance of the step based on a trigger condition. For example, an instance of the step may be aborted if a resource is not responding.

Operation block 808 is the main execution block of step and is performed once per step-level worker assuming no skip or aborts actions. At this stage, the step-level workers perform the executable action defined in the recipe specification. As previously described, there may be different implementations of an executable action depending on the resource against which an instance of a step is being executed.

Post block 810 may also be evaluated once per step-level worker assuming no skip or abort actions. One or more of the post-processing actions previously described may be performed by each step-level worker. In one or more embodiments, each step-level worker determines whether to complete, retry, or abort the instance of the step based on a trigger condition. If a step instance did not complete successfully, then a rollback operation may be performed to restore the resource to a previous state. For instance, if a patch operation was not successful, then a previous version of a software binary may be restored.

Step worker context block 812 gathers the execution context for each step-level worker. In one or more embodiments, the execution context identifies the completion status of a step-level worker. For example, the execution context may indicate whether the step successfully completed, unsuccessfully completed, or was aborted. Additionally or alternatively, the execution context includes one or more result data objects or values for each step-level worker. For example, the execution context may include a data object extracted from a response message to a RESTful call After block 814 is performed once per global step execution assuming the step has not been skipped or aborted. After block 814 may perform one or more of the post-processing operations previously described. After block 814 differs from post block 810 in that the post-processing operations are performed for the step on a global basis rather than on an individual step instance basis. For example, after block 814 may determine whether a compensating action should be performed based on whether a threshold number of step instances successfully completed or not. As another example, after block 814 may determine whether to wait for or terminate long-running instances of a step. Additionally or alternatively, after block 814 may merge data from all step-level workers into a single result.

Step context block 816 corresponds to the global step execution context. For example, the global step execution context may indicate whether the global step successfully completed, how many instances of the step completed successfully, and which step-level workers failed, if any.

Publish block 818 may also be performed once per global step execution assuming the step has not been skipped or aborted. In one or more embodiments, publish block 818 published the results from a global step execution. The results may then be consumed by other steps or recipe that are being executed within system 100. The results may be encapsulated and/or encrypted to enhance data security.

The flexible triggering points allow invoking compensating actions for failure handling at each stage. During post-processing, users may construct inputs for compensating workflows. The compensating workflow can be invoked automatically upon failure or after user intervention. For some failures, user input may be preferred as users may have more context to deal with the failure. However, in other cases, a failure may be addressed by attempting an automatic redo or undo for each failed stage.

In one or more embodiments, a rollback or cleanup workflow may be triggered on failure at any of the triggering points highlighted above. As an example rollback operation, a user may have cloned a database using a March 1 backup. The user may initiate a refresh from an April 1 backup. A restore operation may then fail, triggering a compensating action. In response, a rollback workflow may be invoked that restores the database to the same state prior to starting the refresh operation.

As an example cleanup operation, a user may request to provision a database cloud service with data. In response, the system may create an empty instance of the database cloud service and start creating the database from backup. The database creation may then fail. In response, the system may trigger a new compensation workflow/recipe that automatically deletes the instance of the database cloud service.

Different compensating workflows may be invoked depending on the state of a recipe execution. For example, an error handling process may proceed as follows:

1. Check if an error is recoverable

2. If the error is recoverable, invoke retry operation
3. If the error is not recoverable, invoke the rollback operation For retry operations, the compensating workflow may attempt the retry on a periodic basis, with exponential backoff and/or jitter. A separate compensating action may be invoked if the retry operation fails a threshold number of times. The conditions under which an error is classified as recoverable may vary from implementation to implementation. For example, an error may be classified as recoverable if a resource against which the target is executing is responsive and in a non-error state. Conversely, the error may be classified as non-recoverable if the resource is nonresponsive and/or in an error state. As another example, the error may be classified as not recoverable if the retry operation fails a threshold number of times.

The error handling logic and/or other compensating actions may be exposed to and configurable by a user during the recipe composition phase. For example, the user may select the conditions under which to attempt retries, rollbacks, and/or other compensating actions. The user may select compensating actions at any combination of triggering points previously described. Thus, the compensating actions may be highly configurable and variable from one recipe to the next.

7. Anomaly Detection and Log Analytics

As previously indicated, orchestration service 136 may store execution statistics (e.g., elapsed execution time for a step worker, step, workflow worker) as regular metrics in data repository 126. Baseline and anomaly detection services 124 may train and evaluate models to automatically detect execution anomalies, such as abnormally large execution times. An anomaly detection model may use supervised or unsupervised machine-learning techniques, such as regression and/or clustering, to represent expected distributions in execution times. Example techniques for training baseline models are described in U.S. patent application Ser. No. 15/609,938, titled "Unsupervised Method for Baselining and Anomaly Detection in Time-Series Data for Enterprise Systems", and U.S. patent application Ser. No. 15/902,830, titled "Optimization For Scalable Baselining Using Time-Series Models", both of which were previously incorporated by reference.

In one or more embodiments, different anomaly detection models are trained for different stages of execution. For example, a recipe may be executed on a weekly basis. For each recipe execution, execution statistics, such as elapsed execution times, may be captured for individual step instances, global steps, individual recipe instances, and/or global recipes. A separate anomaly detection model may be trained for each of these stages using the corresponding execution statistics at the stage.

In one or more embodiments, anomaly monitoring and detection is performed at different stages of a recipe execution. For instance, a recipe that is executed on a weekly basis may have anomalies detected for the global recipe execution, individual recipe-level workers, global step execution, and/or individual step-level workers. An anomaly may be detected if the elapsed time at any of these stages falls outside of an expected distribution. An elapsed time may be too long or too short. Both scenarios may be indicative that a problem has occurred. Additionally or alternatively, models may be trained on other metrics. For example, an anomaly may be detected if an unexpected number of compensating actions have been triggered for a given stage or an unexpected number of step-level workers have been instantiated. Thus, parameters that are monitored for anomalies at each stage may vary from one implementation to the next.

In one or more embodiments, anomaly detection models are trained across executions of different recipes. Different recipes may share one or more steps. For example, a patch operation may be shared by two different recipe workflows. In this case, the execution statistics for the step may be collected for both recipes and used to train an aggregate model for the step. The aggregate model may be used to detect anomalies in either recipe or in different recipes that also share the same step.

If an anomaly is detected, then one or more responsive actions may be taken. In one or more embodiments, the responsive action includes an auto-remediation action. Example auto-remediation actions may include, without limitation, rolling back to a previous state, restarting a service, stopping a service retrying a recipe execution, and modifying resource configurations. Additionally or alternatively, an alert may be sent to a user via one or more data communication networks. The user may take corrective action if an auto-remediation action has not already been initiated.

In one or more embodiments, the anomaly detection models may be used to provide forecasts for a recipe execution. As previously indicated, an anomaly detection model may learn expected execution metrics, such as elapsed time, for various stages of execution. These expected metrics may serve as a forecast for future executions, even for recipes that have not previously been executed. For example, a recipe may be composed of steps that overlap with other recipes. The expected execution times may be extrapolated on a per step basis and presented to an end user for both the individual stages and the global stages. The estimate may allow a user to more efficiently schedule and execute recipes.

In one or more embodiments, log analytic services 122 provides interfaces through which recipe execution results and output can be interactively searched and visualized in context of other logs. The interfaces may allow the user to input search terms, apply filters, and generate interactive visualizations from a set of logs. A log in this context is a data object that stores execution results and or output from one or more stages of a recipe execution. Recipe and/or step-level workers may upload this data to log analytic services 122, which may index and/or otherwise structure the data.

In one or more embodiments, logs from one or more recipe executions are indexed and searchable across one or more dimensions. Example dimensions may include, without limitation, target resource, execution time, error messages, severity, and stage output. The dimensions may be used to efficiently search and analyze logs for a variety of scenarios. For example, a user may search for scheduled executions on a give entity across time. The scheduled executions on the target may span multiple steps across one or more recipes. In another example, a user may search for the logs for the same execution across different entities, such as logs produced by different recipe-level workers and/or step-level workers. In yet another example, a user may search for specific errors or text in execution outputs.

In one or more embodiments, log analytic services 122 allows for actions to be performed on saved log searches. For example, a user may save a search that monitors for text indicating errors or failures in an output. If a log that satisfies the saved search criteria is identified, then the specified action may be triggered. For example, an alert may be sent and/or displayed to an end user.

In one or more embodiments, log analytic services 122 allows logs to be visualized in time sequence. The visualization may help isolate the root cause of any problems that occurred during one or more recipe executions. For example, the user may pinpoint the resource, time, stage, and worker process at which time for which an error was generated.

Figure 9:
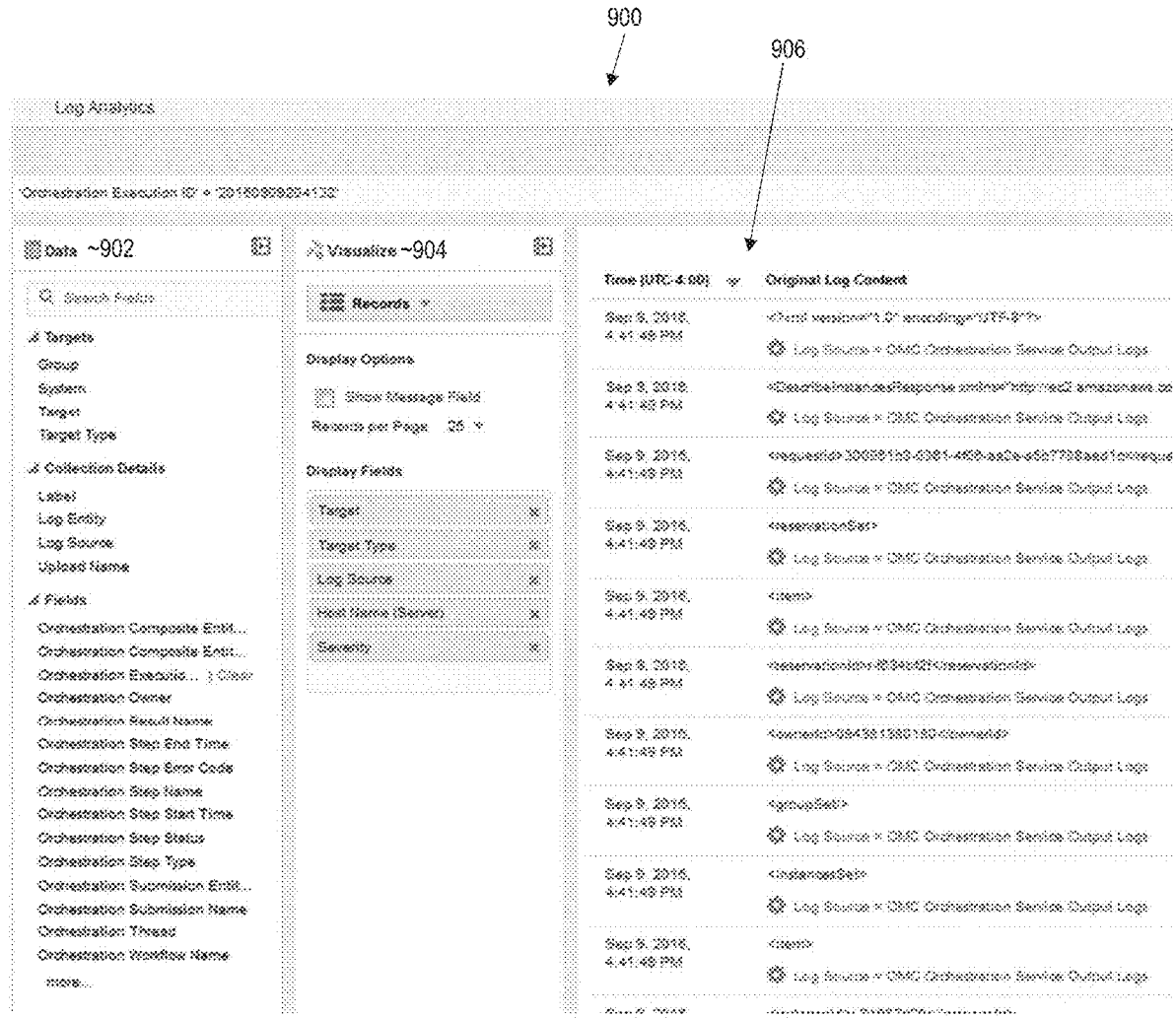
FIG. 9 illustrates an example interface for querying and filtering log analytic data, in accordance with one or more embodiments.

FIG. 9 illustrates example interface 900 for querying and filtering log analytic data, in accordance with one or more embodiments. Interface element 902 allows the user to query and filter logs data across many different dimensions. These dimensions may include, but are not limited, a target entity type (e.g., database server, database hose, web server, etc.), a selected target entity (e.g., a specified database instance), a recipe specification (e.g., patch recipe, stop recipe, etc.), execution time, and type of error.

In response to a query, the log analytic service may return all logs that match the intersection of dimensions. Interface element 906 provides an interactive visualization for all the matched logs. This visualization may allow a user to quickly determine where errors are occurring in a system and what events might be causing them. For example, execution of a step for one recipe on an entity may be blocking execution of a step for another recipe. The user may quickly query the recipe logs for a specified entity to see that execution of both steps happened at substantially the same time, causing one of the steps to fail. A user may drill down on the log entries by clicking on or otherwise interacting with an individual log entry. Drilling down on a log entry may present the log contents and/or more information about the log through interface element 906.

Interface element 904 the user to configure various display options for the interactive visualization. In the example illustrated, the user may configure how many log records are displayed per page, whether the log message is displayed, and which information about the logs is displayed. In response to modifying one or more of these options, the visualization is updated to present the selected information. Thus, the visualization may be customized to present information that is most relevant to a particular analysis in a streamlined fashion.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other.

These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
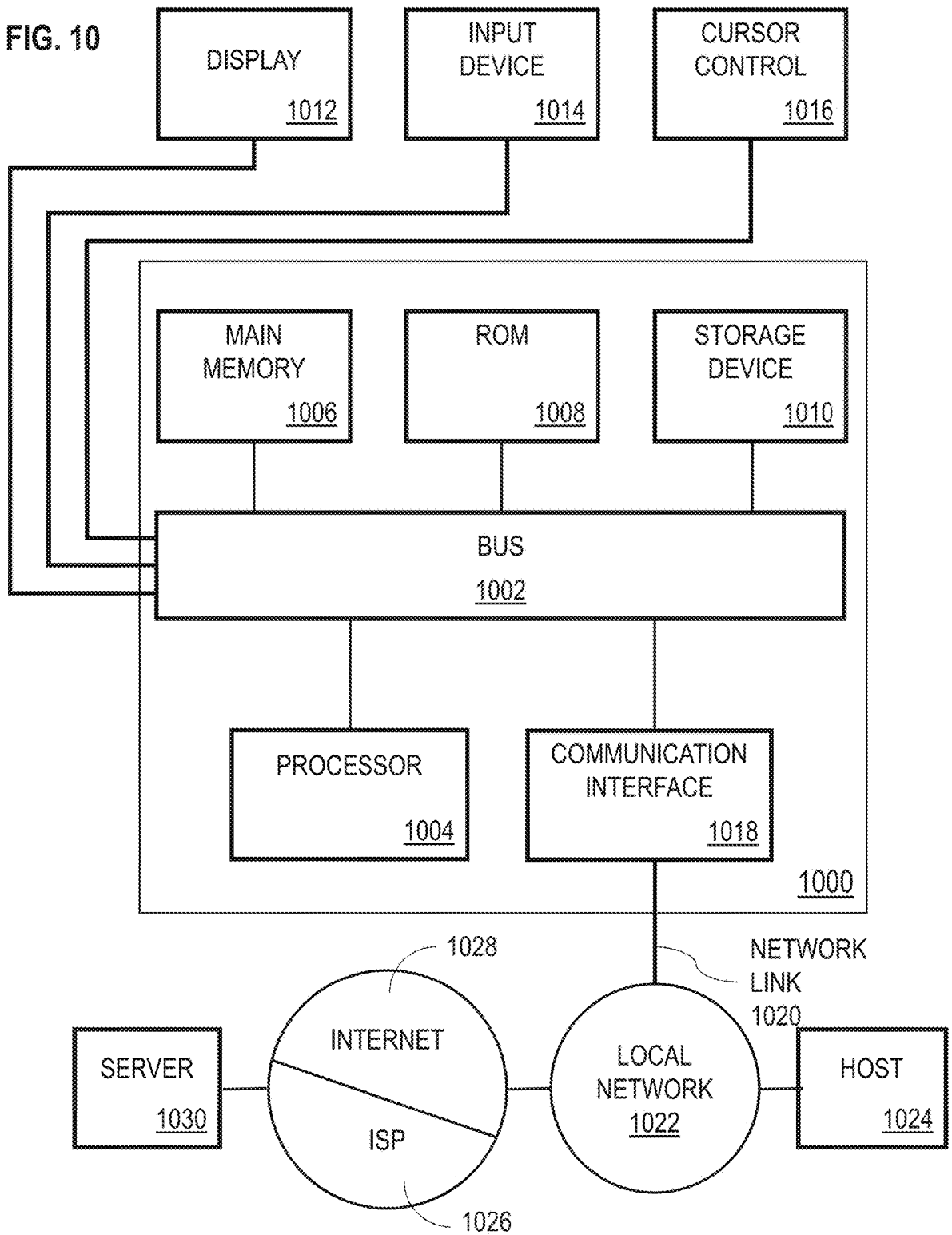
FIG. 10 illustrates an example computing system upon which one or more embodiments may be implemented.

For example, FIG. 10 is a block diagram that illustrates computer system 1000 upon which one or more embodiments may be implemented. Computer system 1000 includes bus 1002 or other communication mechanism for communicating information, and hardware processor 1004 coupled with bus 1002 for processing information. Hardware processor 1004 may be, for example, a general purpose microprocessor.

Computer system 1000 also includes main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes read only memory (ROM) 1008 or other static storage device coupled to bus 1002 for storing static information and instructions for processor 1004. Storage device 1010, such as a magnetic disk or optical disk, is provided and coupled to bus 1002 for storing information and instructions.

Computer system 1000 may be coupled via bus 1002 to display 1012, such as a cathode ray tube (CRT), liquid crystal display (LCD), or light-emitting diode (LED), for displaying information to a computer user. Input device 1014, which may include physical and/or touchscreen based alphanumeric keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to host computer 1024 or to data equipment operated by Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

11. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving a request to execute a recipe specification that defines a set of steps to execute for a particular recipe;
  responsive to receiving the request to execute the recipe specification, instantiating a set of two or more recipe-level processes;
  wherein each recipe-level process in the set of two or more recipe-level processes manages parallel execution of a respective instance of the particular recipe;
  triggering, by each recipe-level process in the set of two or more recipe-level processes for the respective instance of the particular recipe managed by the recipe-level process, execution of the set of steps;
  wherein triggering execution of at least one step in the set of steps by a recipe-level process comprises instantiating, by the recipe-level process, a plurality of step-level processes to attempt execution of different instances of the step in parallel;
  wherein at least one of the step-level processes completes execution of an instance of the step.

2. The method of claim 1, wherein the step-level processes attempt execution of the different instances of the step on different target resources; wherein the different target resources are specially configured to execute step instances of a particular type, and the executed step instance is of the particular type; wherein other different target resources are specially configured to execute step instances of another particular type but not of the particular type.

3. The method of claim 1, further comprising determining how many recipe-level processes to instantiate based, at least in part, on a set of input parameters associated with the recipe specification.

4. The method of claim 3, wherein the set of input parameters identify a plurality of systems on which to executed the particular recipe; wherein at least one recipe-level process is instantiated to manage execution of the particular recipe on each system.

5. The method of claim 1, further comprising determining how many step-level processes to instantiate based, at least in part, on a set of topology metadata associated with a plurality of target resources.

6. The method of claim 5, wherein the topology metadata identifies which target resources are associated with a particular group; wherein at least one step-level process is instantiated for each target resource that is a member of the particular group.

7. The method of claim 1, wherein executing at least one step in the set of steps triggers a call to execute a second recipe; wherein a second set of two or more recipe-level processes are instantiate to manage execution of at least one respective instance of the second recipe; wherein a result generated by execution of the at least one respective instance of the second recipe is used as a step result for the step that triggered the call to execute the second recipe.

8. The method of claim 1, further comprising checking execution status at one or more of the following stages: before instantiating the step-level processes; before a step-level process executes the step on a target resource, after the step-level process executes the step on a target resource and before aggregating outputs from the plurality of step-level process; and after aggregating outputs from the plurality of step-level process; and responsive to detecting a failure, performing one or more compensating actions.

9. The method of claim 8, wherein the one or more compensating actions include at least one of a rollback operation, an abort operation, a retry operation, or a cleanup operation.

10. The method of claim 1, further comprising aggregating results for step-level workers associated with same instance of the particular recipe.

11. One or more non-transitory computer-readable media storing instructions, which when executed by one or more processors, cause operations comprising:
receiving a request to execute a recipe specification that defines a set of steps to execute for a particular recipe;
responsive to receiving the request to execute the recipe specification, instantiating a set of two or more recipe-level processes;
wherein each recipe-level process in the set of two or more recipe-level processes manages parallel execution of a respective instance of the particular recipe;
triggering, by each recipe-level process in the set of two or more recipe-level processes for the respective instance of the particular recipe managed by the recipe-level process, execution of the set of steps;
wherein triggering execution of at least one step in the set of steps by a recipe-level process comprises instantiating, by the recipe-level process, a plurality of step-level processes to attempt execution of different instances of the step in parallel;
wherein at least one of the step-level processes completes execution of an instance of the step.

12. The one or more non-transitory computer-readable media of claim 11, wherein the step-level processes attempt execution of the different instances of the step on different target resources; wherein the different target resources are specially configured to execute step instances of a particular type, and the executed step instance is of the particular type; wherein other different target resources are specially configured to execute step instances of another particular type but not of the particular type.

13. The one or more non-transitory computer-readable media of claim 11, the operations further comprising determining how many recipe-level processes to instantiate based, at least in part, on a set of input parameters associated with the recipe specification.

14. The one or more non-transitory computer-readable media of claim 13, wherein the set of input parameters identify a plurality of systems on which to executed the particular recipe; wherein at least one recipe-level process is instantiated to manage execution of the particular recipe on each system.

15. The one or more non-transitory computer-readable media of claim 11, the operations further comprising determining how many step-level processes to instantiate based, at least in part, on a set of topology metadata associated with a plurality of target resources.

16. The one or more non-transitory computer-readable media of claim 15, wherein the topology metadata identifies which target resources are associated with a particular group; wherein at least one step-level process is instantiated for each target resource that is a member of the particular group.

17. The one or more non-transitory computer-readable media of claim 11, wherein executing at least one step in the set of steps triggers a call to execute a second recipe; wherein a second set of two or more recipe-level processes are instantiate to manage execution of at least one respective instance of the second recipe; wherein a result generated by execution of the at least one respective instance of the second recipe is used as a step result for the step that triggered the call to execute the second recipe.

18. The one or more non-transitory computer-readable media of claim 11, the operations further comprising checking execution status at one or more of the following stages: before instantiating the step-level processes; before a step-level process executes the step on a target resource, after the step-level process executes the step on a target resource and before aggregating outputs from the plurality of step-level process; and after aggregating outputs from the plurality of step-level process; and responsive to detecting a failure, performing one or more compensating actions.

19. The one or more non-transitory computer-readable media of claim 18, wherein the one or more compensating actions include at least one of a rollback operation, an abort operation, a retry operation, or a cleanup operation.

20. The one or more non-transitory computer-readable media of claim 11, the operations further comprising aggregating results for step-level workers associated with same instance of the particular recipe.

* * * * *

UNITED STATES PATENT AND TRADEMARK OFFICE
CERTIFICATE OF CORRECTION

| | | |
|---|---|---|
| PATENT NO. | : 10,678,601 B2 | Page 1 of 1 |
| APPLICATION NO. | : 15/978454 | |
| DATED | : June 9, 2020 | |
| INVENTOR(S) | : Wong et al. | |

It is certified that error appears in the above-identified patent and that said Letters Patent is hereby corrected as shown below:

In the Specification

Column 9, Line 24, delete "entity" and insert -- entity. --, therefor.

Column 9, Line 24-28, delete "Recipe submission 208 may request the immediate or scheduled execution of a specific recipe. In one or more embodiments, recipe submission may specify the following:" and insert the same on Column 9, Line 25 as a new paragraph.

Column 14, Line 44, delete "embodiments;" and insert -- embodiments. --, therefor.

Column 17, Line 16, delete "execution" and insert -- execution. --, therefor.

Column 18, Line 12, after "call" insert -- . --.

Column 20, Line 44, delete "and or" and insert -- and/or --, therefor.

Column 20, Line 56, delete "give" and insert -- given --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*